United States Patent
Liu et al.

(10) Patent No.: US 7,286,707 B2
(45) Date of Patent: Oct. 23, 2007

(54) OBJECT-DETECTION METHOD MULTI-CLASS BHATTACHARYYA BOOST ALGORITHM USED THEREIN

(75) Inventors: Tyng-Luh Liu, Taipei (TW); Yen-Yu Lin, Taipei (TW)

(73) Assignee: National Chiao Tung University, Hsinchu (TW)

( * ) Notice: Subject to any disclaimer, the term of this patent is extended or adjusted under 35 U.S.C. 154(b) by 251 days.

(21) Appl. No.: 11/117,538

(22) Filed: Apr. 29, 2005

(65) Prior Publication Data

US 2006/0248029 A1    Nov. 2, 2006

(51) Int. Cl.
*G06K 9/46* (2006.01)

(52) U.S. Cl. .............. 382/190; 382/103; 382/159; 382/224; 706/20; 706/48

(58) Field of Classification Search ........... 382/103, 382/118, 156, 159, 224, 225, 165, 228; 706/12, 706/16, 20, 48
See application file for complete search history.

(56) References Cited

U.S. PATENT DOCUMENTS

| | | | | |
|---|---|---|---|---|
| 5,822,741 | A * | 10/1998 | Fischthal | 706/16 |
| 6,052,483 | A * | 4/2000 | Baird et al. | 382/190 |
| 6,590,999 | B1 * | 7/2003 | Comaniciu et al. | 382/103 |
| 6,609,093 | B1 * | 8/2003 | Gopinath et al. | 704/236 |
| 6,829,384 | B2 * | 12/2004 | Schneiderman et al. | 382/154 |
| 6,859,210 | B2 * | 2/2005 | Luo et al. | 345/589 |
| 6,993,193 | B2 * | 1/2006 | Smith | 382/224 |
| 7,010,167 | B1 * | 3/2006 | Ordowski et al. | 382/225 |
| 7,016,881 | B2 * | 3/2006 | Li et al. | 706/12 |
| 7,024,033 | B2 * | 4/2006 | Li et al. | 382/159 |
| 7,031,499 | B2 * | 4/2006 | Viola et al. | 382/118 |
| 7,050,607 | B2 * | 5/2006 | Li et al. | 382/118 |
| 7,099,505 | B2 * | 8/2006 | Li et al. | 382/159 |
| 7,099,510 | B2 * | 8/2006 | Jones et al. | 382/225 |
| 7,167,519 | B2 * | 1/2007 | Comaniciu et al. | 375/240.08 |
| 7,171,025 | B2 * | 1/2007 | Rui et al. | 382/103 |
| 7,190,829 | B2 * | 3/2007 | Zhang et al. | 382/165 |
| 7,203,669 | B2 * | 4/2007 | Lienhart et al. | 706/48 |
| 7,212,651 | B2 * | 5/2007 | Viola et al. | 382/103 |
| 2006/0248029 | A1 * | 11/2006 | Liu et al. | 706/20 |

* cited by examiner

*Primary Examiner*—Gregory M Desire
(74) *Attorney, Agent, or Firm*—Rosenberg, Klein & Lee

(57) ABSTRACT

The present invention discloses an object-detection method and a multi-class Bhattacharyya Boost algorithm used therein, wherein firstly, integral images are calculated from an image data in order to speed up the extraction of the characteristics of the objects; then, multiple rectangles of different sizes are scanned at different locations of the image data, and the multi-class Bhattacharyya Boost algorithm is used to detect multi-class objects. In the present invention, the detection framework can use only one single boosted cascade to determine the status and position of the object inside the image data. The simultaneous multi-class detection of the present invention can effectively overcome the detection difficulties resulting from the diversification of object appearances under different conditions. Therefore, the present invention can detect multiple objects simultaneously and can also detect one object having multiple classes of appearances, and further, the detection speed and the system robustness of the present invention are superior to those of the conventional technologies.

5 Claims, 9 Drawing Sheets

OBJECT-DETECTION METHOD MULTI-CLASS BHATTACHARYYA BOOST ALGORITHM USED THEREIN

BACKGROUND OF THE INVENTION

1. Field of the Invention

The present invention relates to a detection method and an algorithm, particularly to an object-detection method, which can process objects having multiple classes of appearances, and a Multi-class Bhattacharyya Boost (MBH-Boost) algorithm used therein.

2. Description of the Related Art

To integrate the digital image processing technology with automatic monitoring/control, building security, or man-machine interaction is an active field the academic circle and the industry endeavor to study and develop. Various achievements thereof will enable automatic processes to replace some human works. Among this field, object detection is a critical preprocessing because it is only after the system has known the positions of target objects that the succeeding processes, such as identifying human faces or other objects in a security system, or monitoring/tracing human beings or vehicles in a monitoring/control system, can be executed. Therefore, object-detection technology has universal utility. And, some objective and measurable factors, such as detection speed, detection accuracy and detection robustness, can be used to evaluate the performance of a detection algorithm.

Recently, the learning mechanism of a boosting algorithm has been often used in object detection, and it can also be integrated with a cascade framework to increase detection speed. The efficiency and accuracy of the object-detection technology based on the boosted cascade has acquired general attention in academic circles, and further researches are also being undertaken, for example, determining the interference factors in detecting human faces, such as illumination, occlusion and rotation angles, and promoting detection accuracy under the influence of a variety of extrinsic factors.

In resolving those discussed above, the present invention proposes an object-detection method and a multi-class Bhattacharyya Boost algorithm used therein to overcome the problems.

SUMMARY OF THE INVENTION

The primary objective of the present invention is to provide a method to detect objects with multiple classes of appearances, wherein the multi-class object can be detected via only using a single boosted cascade, and the execution efficiency and the detection accuracy thereof is promoted thereby.

Another objective of the present invention is to propose a novel Multi-class Bhattacharyya Boost (MBH-Boost) algorithm to overcome the difficulties resulting from the diversified classes of the object appearances shown in different conditions and to enhance the robustness of the system.

According to the present invention, the objection-detection method is based on a multi-class cascade framework. Initially, an object-detection system is provided with an image data; multiple rectangles on the image data are separately scanned by the multi-class object-detection method, and the integral image thereof is used to calculate the projection of the image data; the calculation results will be used to perform multi-class classifications on those rectangles.

According to the object-detection method of the present invention, the Multi-class Bhattacharyya Boost (MBH-Boost) algorithm is used in the object-detection system. Firstly, training data $D^\Gamma$ of a set $\Gamma$ of multiple classes, a set $\phi$ of the projection directions of weak learners, and an iteration number T are provided; a weighted value $w_t^x(i)$ with respect to each item in $D^\Gamma$ is worked out via iterative calculations; an optimal projection direction $\phi_t$ is worked out via the weighted value $w_t^x(i)$; $w_t^x(i)$ is updated to be $w_{t+1}^x(i)$ according to the classification result of the optimal projection direction $\phi_t$; and after T iterations, a vector-valued classifier F, which is used as a decision boundary, can be worked out. The class-wise calculation results for the set $\Gamma = \{A, B, C, \ldots\}$ correspondingly give the component-wise values of the classifier F, i.e., $H^A$, $H^B$, $H^C$, ..., whose maximal positive value will be used as the classification standard.

To enable the objectives, technical contents, characteristics and accomplishments of the present invention to be more easily understood, the embodiments of the present invention are described below in cooperation with the attached drawings.

DETAILED DESCRIPTION OF THE INVENTION

Figure 1:
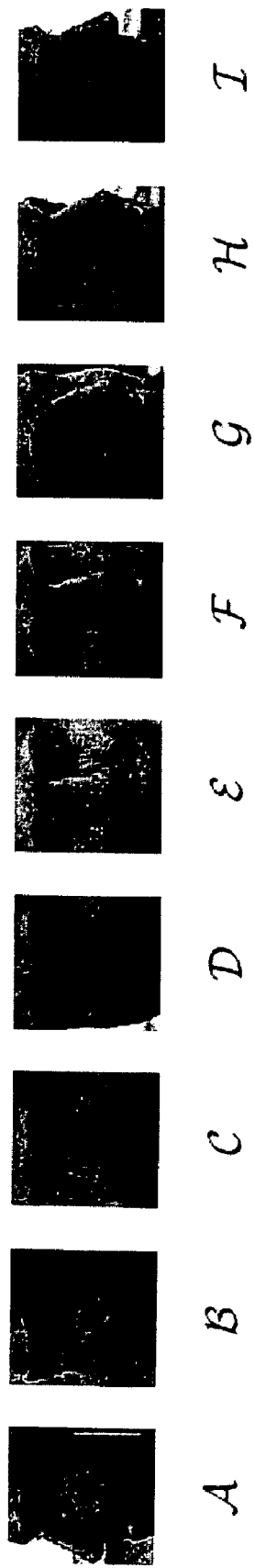
FIG. 1 is a schematic diagram of the multi-class training data according to the present invention.

The primary objective of the present invention is to provide a method to detect objects with multiple classes of appearances, and the method of the present invention is based on two core elements: (1) a classification algorithm—a Multi-class Bhattacharyya Boost (MBH-Boost) algorithm, (2) a detection framework—a multi-class cascade, which are to be described below.

The novel Multi-class Bhattacharyya Boost (MBH-Boost) algorithm primarily functions to simultaneously process the detection of multiple kinds of objects with multiple classes of appearances, and classifier sharing is the primary principle thereof. All classes of objects have a common projection direction; however, an independent decision boundary of each class will be separately learned according to the training data of each kind. Via sharing a common projection, the calculation amount is obviously reduced, and the execution speed increases. In the other side, the independent decision boundary of each kind speeds up the convergence of classification error rate. Therefore, even though only few weak learners are used, classification accuracy rate still maintains high. In theory, the present invention provides a mechanism of selecting an optimal projection direction, and it is proved that the error upper bound is directly lowered thereby; in experiment, the present invention is verified in the detection of four kinds of human faces, and the results thereof show the Multi-class Bhattacharyya Boost (MBH-Boost) algorithm of the present invention is superior to the conventional methods.

In general, the target object is a very scarce incident in comparison with the others in the image, and such a characteristic is often used to speed up the detection process. Among the approaches thereby, the cascade detection framework proposed in 2001 is a well-known one; however, it can only be used to detect a single-class object. The present invention proposes a multi-class cascade framework to solve the problem. In each node of the cascade structure, the embedded classifiers are sequentially learned from the training data varying from simplicity to complexity. In contrast with the other methods for detecting the multi-class object, the algorithm of the present invention needs only a single boosted cascade framework; therefore, the algorithm of the present invention is superior to the conventional ones in detection speed, accuracy, and robustness.

Besides, the detection method of the present invention neither applies any further limitation to the desired object nor applies any special presumption between different classes of the object; therefore, the present invention has superior generality and flexibility in application; for example, the present invention is adaptable to (1) identify various kinds of objects, such as human beings, vehicles, or human faces, (2) identify multiple classes of variant appearances of a single object, such as the frontal face, the profile face and the rotated face of a human being, or human faces under different lighting conditions, (3) identify the combination case of two abovementioned ones. Thus, the present invention can be widely applied to the automatic processing system based on digital image processing technology.

The MBH-Boost of the present invention is an algorithm based on machine learning, and the system must be constructed through a well-designed training stage before it can be used to reliably perform the testing stage for its practical application. These two stages are to be described below.

Training Stage

The method of the present invention will be exemplified by the detection of profile faces. As shown in FIG. 1, $\Gamma=\{A, B, \ldots, I\}$ designates the set of the denotations of nine profile faces having different rotation angles, and $|\Gamma|=9$.

Training Data:

Training data $D^\Gamma$ is a set of object images and non-object images and has the correct labels thereof. There are nine classes in the exemplifying profile face detection, and nine types of training data are expressed as:

$$D^A = \{(x_1^A, y_1^A), \ldots, (x_{|D^A|}^A, y_{|D^A|}^A)\} = D^{A+} \cup D^{A-} \quad (1)$$

-continued $$D^B = \{(x_1^B, y_1^B), \ldots, (x_{|D^B|}^B, y_{|D^B|}^B)\} = D^{B+} \cup D^{B-}$$

$$\vdots$$

$$D^I = \{(x_1^I, y_1^I), \ldots, (x_{|D^I|}^I, y_{|D^I|}^I)\} = D^{I+} \cup D^{I-}$$

$$D^\Gamma = D^A \cup D^B \cup \ldots D^I$$

MBH Weak Learner:

Each MBH weak learner has a projection direction, and in the present invention, the MBH weak learners share a common projection direction for all the classes of the desired object. According to the positive and negative training data of each class, two distributions are formed in a one-dimensional subspace after projection. According to the distributions, each class learns and obtains its own decision boundary independently. Let f be a weak leaner, which comprises a projection direction $\phi$, and x be a pattern input to f. The decision process can be expressed as:

$$f(x) = [h^A(x), \ldots, h^I(x)] \text{ (profile face detection)} \quad (2)$$

$$= [h^\chi(x) | \chi \in \Gamma], \text{ (general case)}$$

wherein $$h^\chi(x) = \ln\sqrt{p_k^{\chi+}(\phi) / p_k^{\chi-}(\phi)} \text{ if } \phi^T x \in b_k. \quad (3)$$

$$p_k^{\chi+}(\phi) = \sum_{i_k^{\chi+}(\phi)} w^\chi(i) \text{ and } p_k^{\chi-}(\phi) = \sum_{i_k^{\chi-}(\phi)} w^\chi(i)$$

$$i_k^\chi(\phi) = \{i | x_i \in D^\chi, \phi^T x_i \in b_k\}$$

Figure 2:
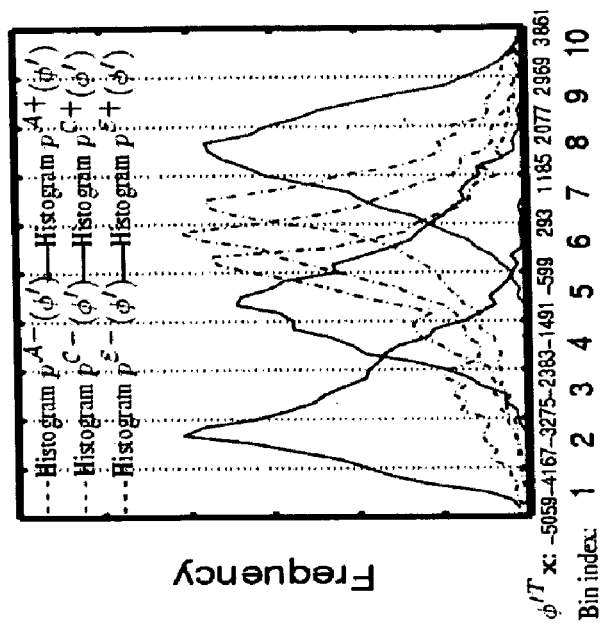
FIG. 2 is a schematic diagram showing that the action of the projection directions on the classes A, C, and E according to the present invention.
Figure 2:
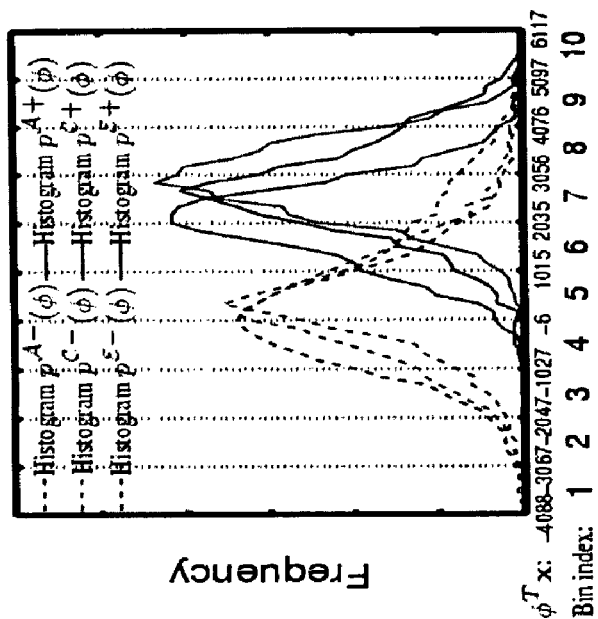
Figure 2:

Refer to FIG. 2 showing the action of two projection directions and corresponding weak learners on the classes of A, C, and E in the 10-bin subspace.

Multi-Class Bhattacharyya Boost (MBH-Boost) Algorithm:

To utilize the MBH-Boost algorithm, the following parameters and data are needed: (1) the training data $D^\Gamma$ of detection classes $\Gamma=\{A, B, C, \ldots I\}$, (2) the set $\Phi$ of projection directions of the weak learner, (3) the number of iteration T. In the "t"th iteration of MBH-Boost algorithm, the weighted value $w_t^x(i)$ of each component in the training data $D^\Gamma$ is updated, and an optimal projection direction $\phi_t$ will be derived from the weighted value $w_t^x(i)$; $f_t$ the vector-valued weak learner can also be worked out from the optimal projection direction $\phi_t$ in the "t"th iteration. The execution process can be expressed by the following algorithm.

---
Algorithm: MBHBoost
---

Input: Face classes, $\Gamma$; $D^\Gamma = \bigcup_{\mathcal{X} \in \Gamma} D^{\mathcal{X}}$;

Projection set, $\Phi$; Number of iterations, T.

Output: A vector-valued MBH classifier F.

Initialize: the weight vector $w_1^{\mathcal{X}}(i) = 1/|D^{\mathcal{X}}|$, for $i = 1, 2, \ldots, |D^{\mathcal{X}}|$ and $\forall \mathcal{X} \in \Gamma$.

for $t \leftarrow 1, 2, \ldots, T$ do

1. Determine the optimal projection $\phi_t$ from $\Phi$ by solving (4).
  2. Construct the MBH weak learner $f_t$ associated with $\phi_t$ using (2).
  3. $w_{t+1}^{\mathcal{X}}(i) \leftarrow w_t^{\mathcal{X}}(i)\exp(-y_i^{\mathcal{X}} h_t^{\mathcal{X}}(x_i^{\mathcal{X}}))/Z_t^{\mathcal{X}}$,
     for $i = 1, 2, \ldots, |D^{\mathcal{X}}|$ and $\forall \mathcal{X} \in \Gamma$.
     ($Z_t^{\mathcal{X}}$ is a normalization factor such that $w_{t+1}^{\mathcal{X}}$ is a distribution)

Output an MBH classifier F: $F(x) = \sum_{t=1}^{T} f_t(x) =$ $[H^{\mathcal{X}}(x) = \sum_{t=1}^{T} h_t^{\mathcal{X}}(x) \mid \mathcal{X} \in \Gamma]$.

---

The vector-valued output of the classifier F includes the calculation results $H^A, H^B, H^C \ldots$ respectively corresponding to each class in each set $\Gamma$, which can be used as the decision boundaries of the corresponding classes. In each of the iterations, the projection direction is selected according to:

$$\phi_t = \underset{\phi \in \Phi}{\operatorname{argmin}} \sum_{\mathcal{X} \in \Gamma} \Delta_t^{\mathcal{X}} \times BHC_t^{\mathcal{X}}(\phi), \quad (4)$$

where $$BHC_t^{\mathcal{X}}(\phi) = \sum_{k=1}^{m} \sqrt{p_k^{\mathcal{X}+}(\phi) p_k^{\mathcal{X}-}(\phi)}.$$

In theory, it is based on the following formulae:

$$BHC_t^{\mathcal{X}}(\phi) = Z_t^{\mathcal{X}}/2. \quad (5)$$

$$\Delta_t^{\mathcal{X}} = |D^{\mathcal{X}}| \sum_{i=1}^{|D^{\mathcal{X}}|} w_1^{\mathcal{X}}(i)\exp\left(-y_i^{\mathcal{X}} \sum_{\tau=1}^{t-1} h_\tau^{\mathcal{X}}(x_i^{\mathcal{X}})\right) \quad (6)$$

$$= |D^{\mathcal{X}}| Z_1^{\mathcal{X}} \sum_{i=1}^{|D^{\mathcal{X}}|} w_2^{\mathcal{X}}(i)\exp\left(-y_i^{\mathcal{X}} \sum_{\tau=2}^{t-1} h_\tau^{\mathcal{X}}(x_i^{\mathcal{X}})\right) = \ldots$$

$$= |D^{\mathcal{X}}| Z_1^{\mathcal{X}} \ldots Z_{t-1}^{\mathcal{X}} \sum_{i=1}^{|D^{\mathcal{X}}|} w_t^{\mathcal{X}}(i)$$

$$= |D^{\mathcal{X}}| \prod_{\tau=1}^{t-1} Z_\tau^{\mathcal{X}}.$$

The optimal solution of the upper bound of the error rate under the projection direction selected by formula (4) can be derived from formulae (5) and (6), as shown below:

$$\sum_{\mathcal{X} \in \Gamma} \Delta_t^{\mathcal{X}} \times BHC_t^{\mathcal{X}}(\phi) = \frac{1}{2}\sum_{\mathcal{X} \in \Gamma} |D^{\mathcal{X}}| \prod_{\tau=1}^{t} Z_\tau^{\mathcal{X}} \propto \sum_{\mathcal{X} \in \Gamma} |D^{\mathcal{X}}| \prod_{\tau=1}^{t} Z_\tau^{\mathcal{X}}. \quad (7)$$

Multi-Class Cascade:

As mentioned above, the multi-class cascade can be used to improve detection accuracy, execution speed, and robustness. In utilizing the MBH-Boost algorithm to construct the nodes of the cascade framework, firstly, the training targets (target detection rate $\mu$ and false-positive rate $\nu$) of each node are to be preset, and target detection rate $\mu$ is usually preset to range from 99.5%~99.9%, and false-positive rate $\nu$ is usually preset to range from 40%~50%. Let $F_k$ be the classifier embedded into the k th node, and the training data in the k th node would be the data passing through the anterior k−1 nodes. Additionally, a voluminous database Q, which collects various images except the object images (human faces in this embodiment), will be constructed to create a negative training data.

The constructing process of the multi-class cascade framework can be expressed by the following algorithm.

---
Algorithm: Multi-Class Cascade: Training
---

Input: $\Phi$; $D^\Gamma$; A set of images containing no faces Q;

Target detection rate $\mu$; False-positive rate $\nu$.

Output: A cascade of MBH classifiers $\{F_1, \ldots, F_\varepsilon\}$;

Number of stage used $s^{\mathcal{X}}$, $\forall \mathcal{X} \in \Gamma$.

Initialize: $k \leftarrow 1$; $\Gamma_k \leftarrow \Gamma$;

while $\Gamma_k \neq \emptyset$ do

With $D^{\Gamma_k}$ and $\Phi$, apply MBH-Boost to derive
  $F_k = [H_k^{\mathcal{X}} \mid \mathcal{X} \in \Gamma_k]$ where each component $H_k^{\mathcal{X}}$
  should achieve the preset $(\mu, \nu)$ requirements;
  foreach $\mathcal{X} \in \Gamma_k$ do
     $D^{\mathcal{X}+} \leftarrow \{(x, y) \mid (x, y) \in D^{\mathcal{X}+} \wedge H_k^{\mathcal{X}}(x) \geq \theta_k^{\mathcal{X}}\}$;
     $D^{\mathcal{X}-} \leftarrow$ False-Positives from $D^{\mathcal{X}-}$ or from
     Q such that $|D^{\mathcal{X}-}| = |D^{\mathcal{X}+}|$;
     if not enough False-Positives then
        $\lfloor s^{\mathcal{X}} \leftarrow k; \Gamma_k \leftarrow \Gamma_k - \{\mathcal{X}\}: s \leftarrow k$;
  $\Gamma_{k+1} \leftarrow \Gamma_k; k \leftarrow k + 1$;

---

Testing Stage

Figure 3:
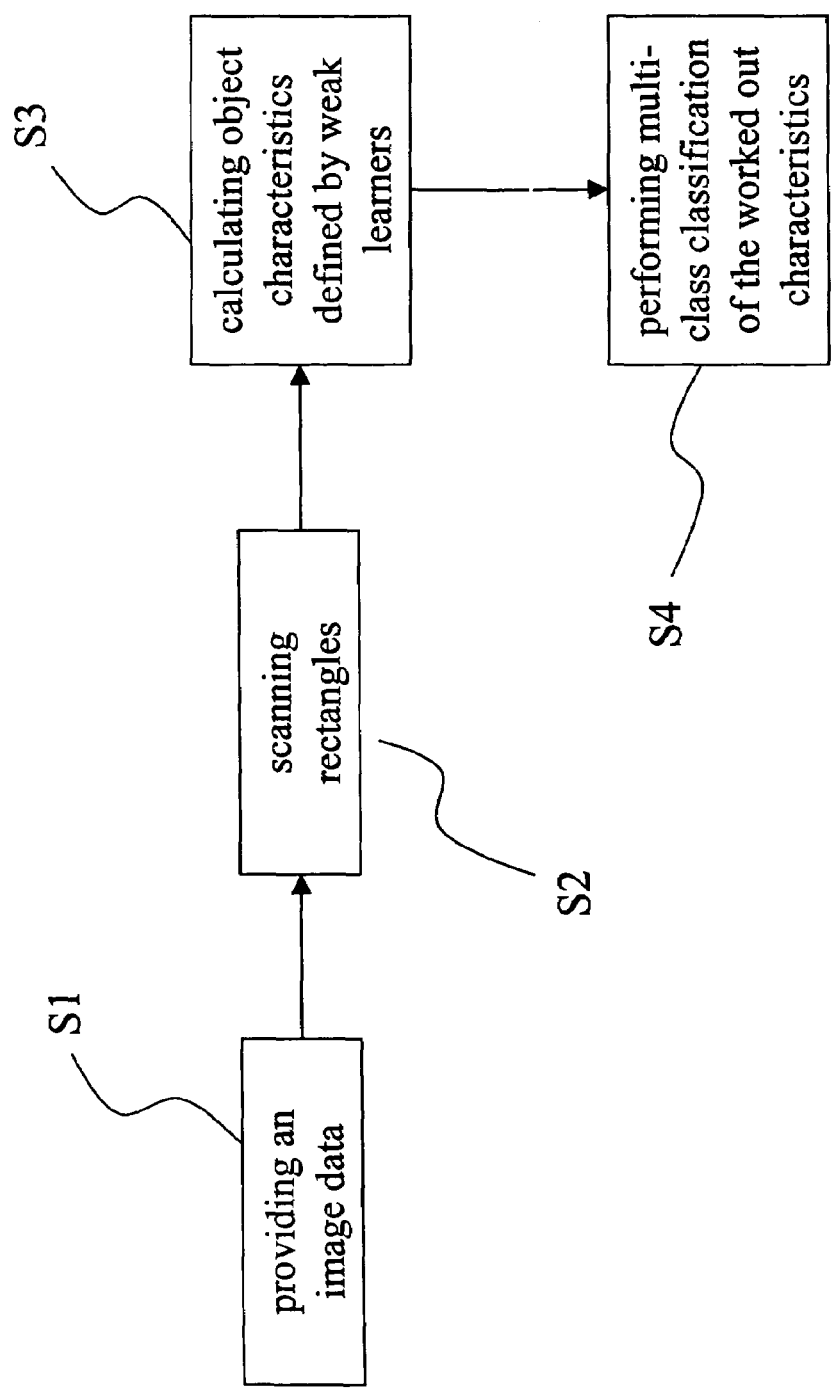
FIG. 3 is a flow chart of the object-detection process according to the present invention.
Figure 4:
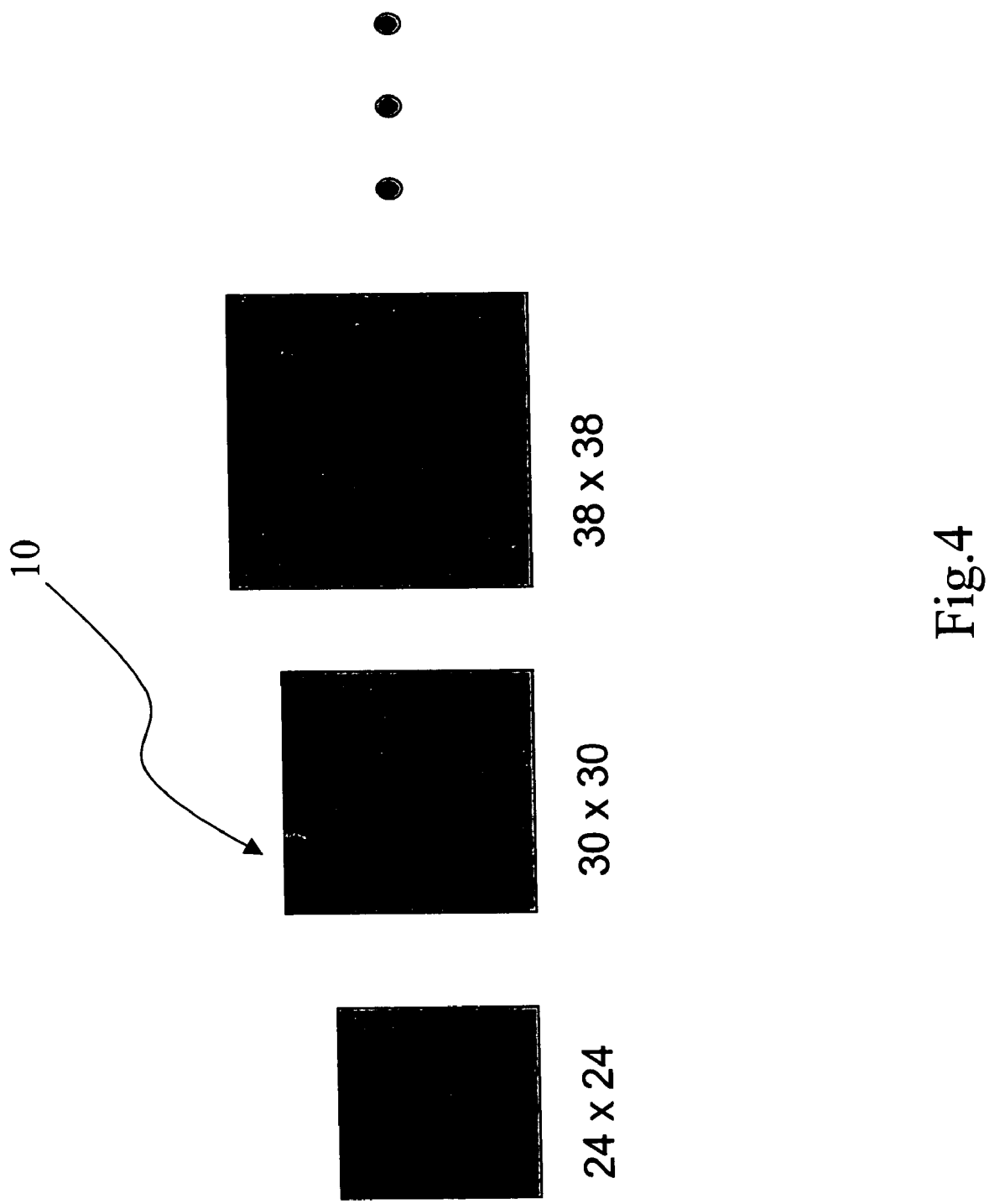
FIG. 4 is a schematic diagram showing the different-size rectangles according to the present invention.
Figure 5:
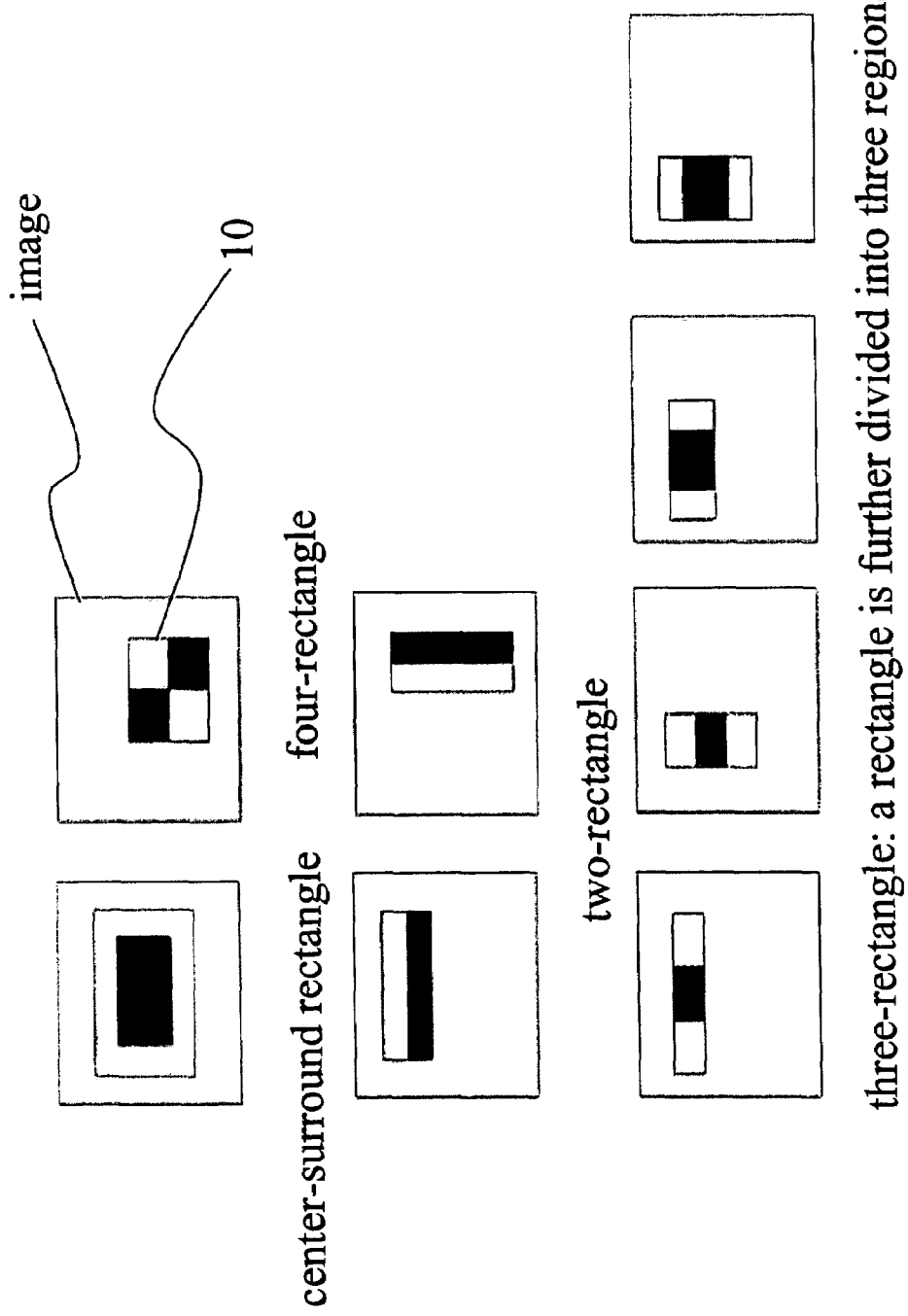
FIG. 5 is a schematic diagram for rectangles of different kinds at specified positions of an image according to the present invention.

As shown in FIG. 3, during testing stage, the first step S1 is to provide an image data for the detection system; referring to FIG. 4, the second step S2 is that the detection system scans multiple rectangles 10 in the image data, and the rectangles 10 are of different sizes, such as 24×24, 30×30, 38×38 . . . ; in the third step S3, the integral images are used to perform the rapid calculation of the projection in the image data defined by each weak learner, and referring to FIG. 5, the projection calculation is to calculate the difference between the sums of the gray-level values in balck region(s) of each rectangle 10 and the sum of gray-level values in the remaining white region(s), and the calculation results will be input to the weak learner; in the fourth step S4, according to the classification results output by multiple previously trained weak learners, the MBH-Boost algorithm is used to perform multi-class classification on the rectangle 10, and a detection framework cascaded by vector-valued classifiers is used to perform the detection in order to determine whether the object is the desired one. Thus, the detection process is completed.

When a test pattern "x" (a rectangle) is input into a multi-class cascade framework having completed the learning, it will be processed as follows:

---
Algorithm:Multi-Class Cascade:Testing
---

Input: A test pattern x; Face classes $\Gamma$; A cascade of detectors $\{F_1, \ldots, F_s\}$; Number of stages, $s^x$, $\forall \mathcal{X} \in \Gamma$.

Output: A vector of boolean outputs, output($\Gamma$).

Initialize: $k \leftarrow 1$; $\Lambda \leftarrow \Gamma$;

while $\Lambda \neq \emptyset$ do

Jointly evaluate $H_k^x(x)$, $\forall \mathcal{X} \in \Lambda$;

foreach $\mathcal{X} \in \Lambda$ do if $H_k^x(x) < \theta_k^x$ then output($\mathcal{X}$) $\leftarrow$ False; $\Lambda \leftarrow \Lambda - \{\mathcal{X}\}$;

else if $k = s^x$ then output($\mathcal{X}$) $\leftarrow$ True; $\Lambda \leftarrow \Lambda - \{\mathcal{X}\}$;

$k \leftarrow k + 1$;

---

The algorithm of the present invention provides each class of the object with a Boolean output, which denotes whether the test pattern (rectangle) is the object of one specified class.

Figure 6:
FIG. 6 is a schematic diagram showing the object detection according to the present invention.
Figure 7:
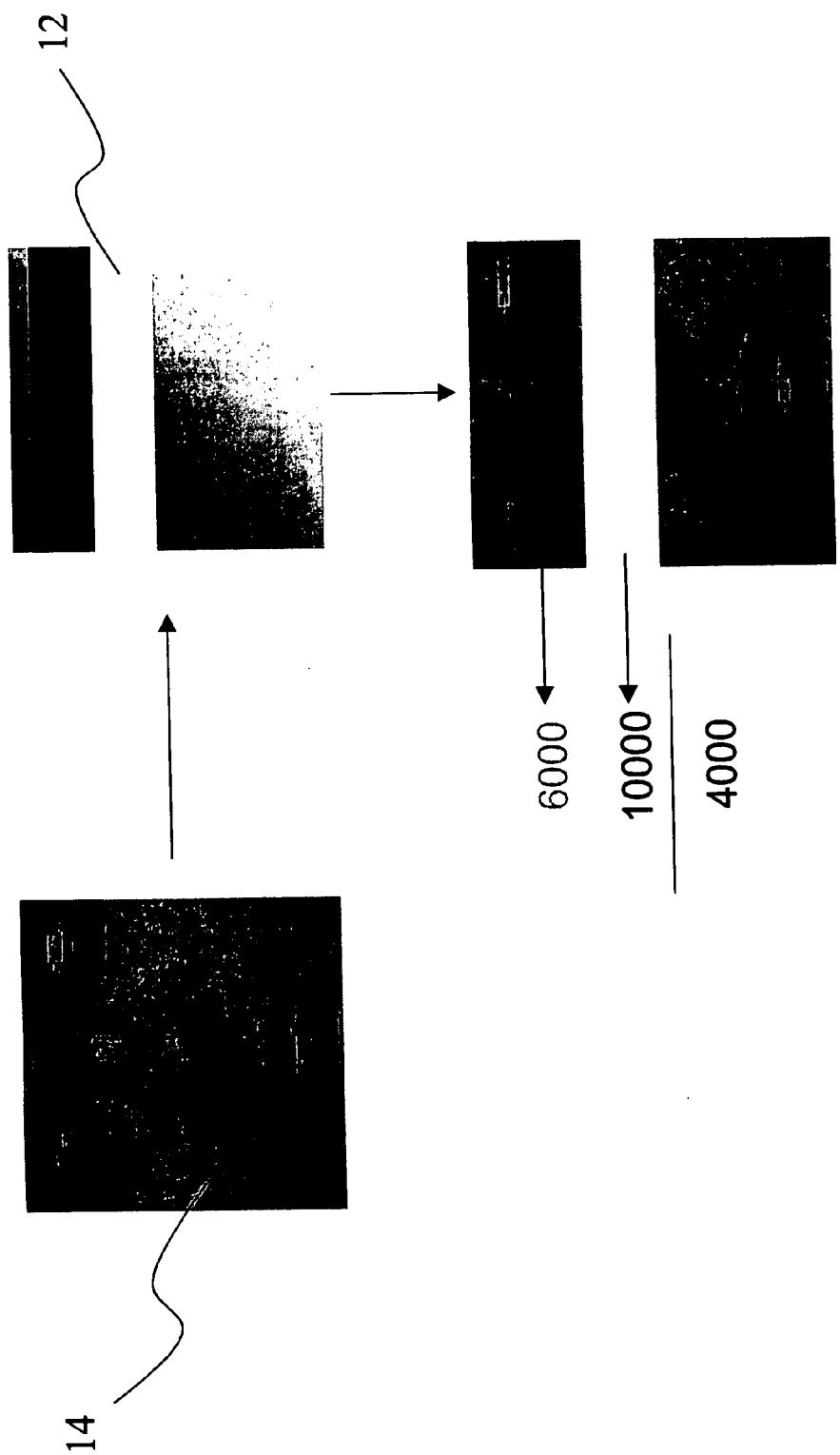
FIG. 7 is a schematic diagram showing the calculation of characteristics inside the image according to the present invention.
Figure 8:
FIG. 8 is a schematic diagram showing the detection of characteristic images and the designation of the characteristics according to the present invention.
Figure 9:
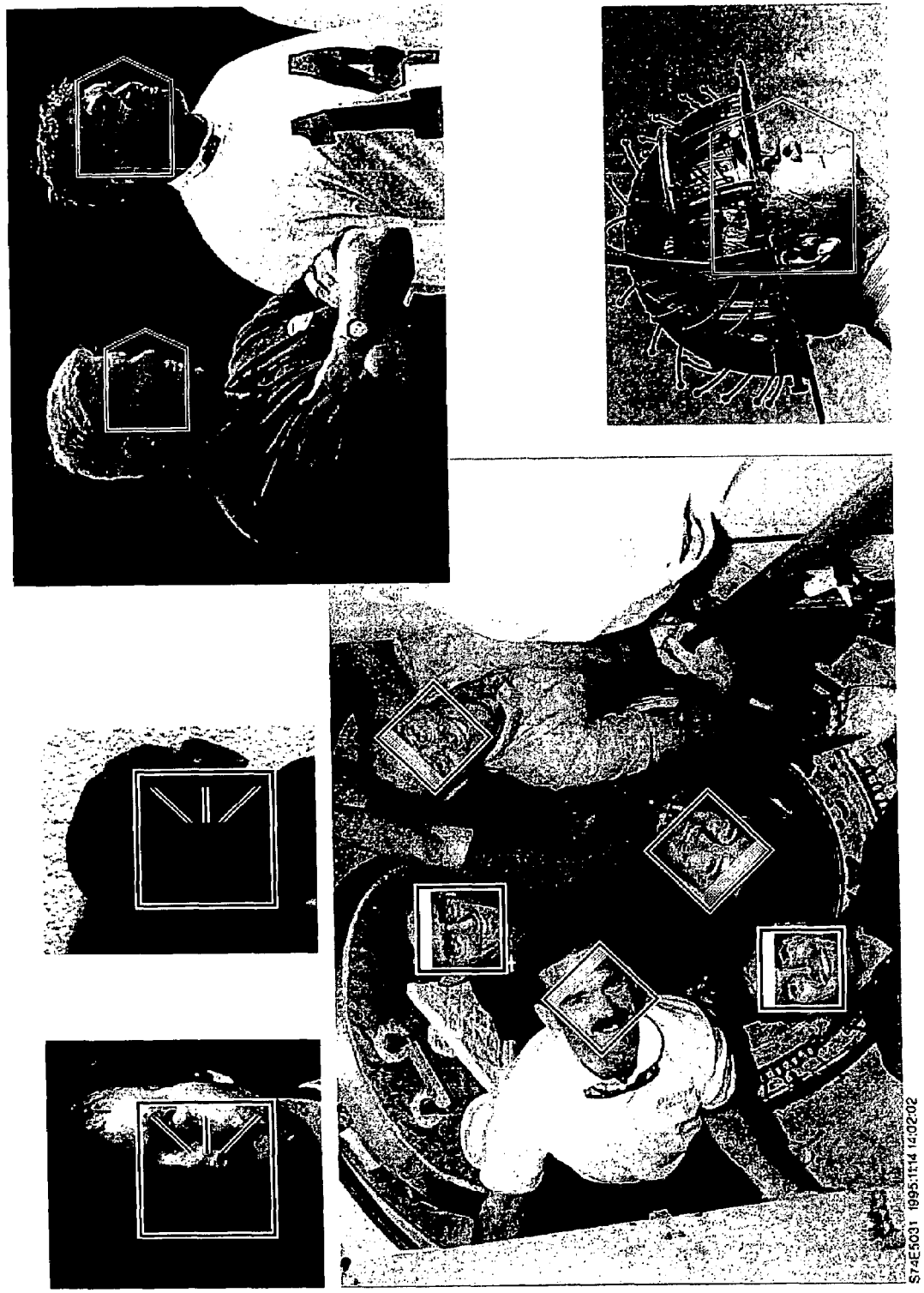
FIG. 9 is another schematic diagram showing the detection of characteristic images and the designation of the characteristics according to the present invention.

When the detection of a human face 14 is used for exemplification, the detection process is as follows: firstly, referring to FIG. 6, the image data 16 is provided; referring to FIG. 7, different sizes of rectangles of the image data 16 are scanned, and the integral images are used to calculate the projections; the MBH-Boost algorithm is used to perform multi-class classification of the human face 14; the single cascade of vector-value classifiers is used to speed up the detection in order to determine the viewing angles and the lighting conditions of the human face 14, as shown in FIG. 8 and FIG. 9.

The object-detection method of the present invention can designate the desired object and the class thereof. When it is exemplified by the human face detection under different lighting conditions or with different rotation angles, the execution results are shown in FIG. 9, wherein the light incident angles and the rotation angles of the human face are all appropriately designated. From the above examples, it can be concluded: the object-detection method of the present invention can overcome the detection difficulties resulting from the diversified classes of the appearances under different conditions, and the robustness of the system can also be obviously improved. As shown in the embodiment of human face detection, in comparison with other detection algorithms, the algorithm of the present invention has the characteristics of instant detection, higher detection accuracy, capability of dealing with multi-class appearances resulting from the rotation angle of the object, viewing angle of the camera, lighting conditions, and occlusion.

Those embodiments described above are not to limit the scope of the present invention but only to clarify the present invention to enable the person skilled in the art to understand, make, and use the present invention. Any equivalent modification and variation according to the spirit of the present invention disclosed herein is to be included within the scope of the present invention.

What is claimed is:

1. An object-detection method, based on a multi-class cascade framework, and provided for a computer-vision system to detect objects in an image data, and comprising the following steps:
    (I) scanning multiple rectangles of said image data;
    (II) utilizing integral images to calculate projections inside said image data; and
    (III) performing multi-class classification of said rectangles according to the results of projection calculation, wherein said image-detection system utilizes a Multi-class Bhattacharyya Boost (MBH-Boost) algorithm to perform a multi-class detection, said MBH-Boost algorithm including the following steps:
        (A) providing training data $D^\Gamma$ of a set $\Gamma$ of multiple classes, a set $\Phi$ of projection directions of weak learners, and a number of iteration T;
        (B) in the "t"th iteration, working out an optimal projection direction $\phi_t$ according to a weighted value $W_t^x(i)$ of each component of said training data $D^\Gamma$;
        (C) updating said weighted value $W_t^x(i)$ into $w_{t+1}^x(i)$ according to the classification results of said $\phi_t$; and
        (D) after T iterations of (B) and (C), working out a vector-valued classifier F, which can be used as decision boundaries, wherein said classifier F includes calculation results $H^A$, $H^B$, $H^C$ ... respectively corresponding to each class in said set $\Gamma$ and positive values of said calculation results $H^A$, $H^B$, $H^C$ ... respectively corresponding to each class in said set $\Gamma$ is used as classification standards.

2. The object-detection method according to claim 1, wherein said object can be a human face, a vehicle, or other specified target.

3. The object-detection method according to claim 1, wherein said multiple classes include classes resulting from viewing angles, occlusions, or lighting conditions.

4. The Multi-class Bhattacharyya Boost (MBH-Boost) algorithm according to claim 1,
    wherein the relationship between said weighted value $w_t^x(i)$ and said optimal projection direction $\phi_t$ is:

$$\phi_t = \operatorname*{argmin}_{\phi \in \Phi} \sum_{\mathcal{X} \in \Gamma} \Delta_t^\mathcal{X} \times BHC_t^\mathcal{X}(\phi),$$

where $$BHC_t^\mathcal{X}(\phi) = \sum_{k=1}^{m} \sqrt{p_k^{\mathcal{X}+}(\phi) p_k^{\mathcal{X}-}(\phi)}.,$$

-continued and wherein $$\Delta_t^\chi = |D^\chi| \sum_{i=1}^{|D^\chi|} w_1^\chi(i) \exp\left(-y_i^\chi \sum_{\tau=1}^{t-1} h_\tau^\chi(x_i^\chi)\right)$$

$$= |D^\chi| Z_1^\chi \sum_{i=1}^{|D^\chi|} w_2^\chi(i) \exp\left(-y_i^\chi \sum_{\tau=2}^{t-1} h_\tau^\chi(x_i^\chi)\right) = \ldots$$

$$= |D^\chi| Z_1^\chi \ldots Z_{\tau-1}^\chi \sum_{i=1}^{|D^\chi|} w_t^\chi(i)$$

$$= |D^\chi| \prod_{\tau=1}^{t-1} Z_\tau^\chi,$$

and $$BHC_t^\chi(\phi) = Z_t^\chi / 2.,$$

and $$\sum_{\chi \in \Gamma} \Delta_t^\chi \times BHC_t^\chi(\phi) = \frac{1}{2} \sum_{\chi \in \Gamma} |D^\chi| \prod_{\tau=1}^{t} Z_\tau^\chi \propto \sum_{\chi \in \Gamma} |D^\chi| \prod_{\tau=1}^{t} Z_\tau^\chi.$$

5. The Multi-class Bhattacharyya Boost (MBH-Boost) algorithm according to claim 1,
wherein said classifier F is defined as:

$$F(x) = \sum_{t=1}^{T} f_t(x)$$

$$= [H^\chi(x) = \sum_{t=1}^{T} h_t^\chi(x) | \chi \in \Gamma],$$

and wherein $f(x) = [h^A(x), \ldots, h^l(x)]$ (profile face detection)

$= [h^\chi(x) | \chi \in \Gamma],$ (general case), and $$h^\chi(x) = \ln\sqrt{p_k^{\chi+}(\phi) / p_k^{\chi-}(\phi)} \text{ if } \phi^T x \in b_k.$$

$$p_k^{\chi+}(\phi) = \sum_{i_k^{\chi+}(\phi)} w^\chi(i) \text{ and } p_k^{\chi-}(\phi) = \sum_{i_k^{\chi-}(\phi)} w^\chi(i)$$

$$i_k^\chi(\phi) = \{i | x_i \in D^\chi, \phi^T x_i \in b_k\}.$$

* * * * *